US011266134B2

United States Patent
Folkersen et al.

(10) Patent No.: US 11,266,134 B2
(45) Date of Patent: Mar. 8, 2022

(54) MAGNETIC FIELD POWERED FISHING LURE

(71) Applicant: Benjamin Folkersen, LLC, East Wakefield, NH (US)

(72) Inventors: Benjamin J Folkersen, East Wakefield, NH (US); Jonny E. Folkersen, East Wakefield, NH (US)

(73) Assignee: Benjamin J. Folkersen, New Port Richey, FL (US)

( * ) Notice: Subject to any disclaimer, the term of this patent is extended or adjusted under 35 U.S.C. 154(b) by 908 days.

(21) Appl. No.: 16/017,310

(22) Filed: Jun. 25, 2018

(65) Prior Publication Data

US 2018/0368375 A1    Dec. 27, 2018

Related U.S. Application Data

(60) Provisional application No. 62/524,177, filed on Jun. 23, 2017.

(51) Int. Cl.
| | | |
|---|---|---|
| *A01K 85/01* | (2006.01) | |
| *A01K 97/12* | (2006.01) | |
| *H02K 7/18* | (2006.01) | |
| *H02K 35/02* | (2006.01) | |
| *H02K 7/14* | (2006.01) | |

(52) U.S. Cl.
CPC ............ *A01K 85/01* (2013.01); *A01K 97/125* (2013.01); *H02K 7/145* (2013.01); *H02K 7/1853* (2013.01); *H02K 35/02* (2013.01)

(58) Field of Classification Search
CPC ....... A01K 85/01; A01K 97/125; A01K 85/14
See application file for complete search history.

(56) References Cited

U.S. PATENT DOCUMENTS

| | | | | |
|---|---|---|---|---|
| 726,020 | A * | 4/1903 | Bryan | A01K 85/16 43/26.2 |
| 3,340,643 | A * | 9/1967 | Weimer | A01K 85/10 43/42.12 |
| 4,055,018 | A * | 10/1977 | Huhta-Koivisto | A01K 85/16 43/42.48 |
| 4,114,305 | A * | 9/1978 | Wohlert | A01K 85/01 310/15 |
| 4,175,348 | A * | 11/1979 | Ray | A01K 85/01 335/205 |
| 4,709,176 | A * | 11/1987 | Ridley | H02K 35/02 310/15 |
| 4,819,361 | A * | 4/1989 | Boharski | A01K 85/02 43/17.6 |
| 5,924,236 | A * | 7/1999 | Preston | A01K 85/16 43/42.31 |

(Continued)

FOREIGN PATENT DOCUMENTS

| | | | | |
|---|---|---|---|---|
| CA | 3014696 A1 | * 10/2019 | | A01K 69/06 |
| CN | 111838085 A | * 10/2020 | | |

(Continued)

*Primary Examiner* — Magdalena Topolski
(74) *Attorney, Agent, or Firm* — Maine Cernota & Rardin

(57) ABSTRACT

A spinner type lure having a magnetized portion that is used to generate a changing magnetic field during a retrieve, which is harnessed by at least one coil positioned within that magnetic field and in operative communication with a light source and associated circuitry embedded in a core thereof, such that, during a retrieve, light is emitted by the lure.

13 Claims, 6 Drawing Sheets

(56) References Cited

U.S. PATENT DOCUMENTS

| | | | | |
|---|---|---|---|---|
| 6,301,822 B1 * | 10/2001 | Zernov | ............... | A01K 85/01 43/42 |
| 7,722,218 B2 * | 5/2010 | Leung | ............... | A01K 85/01 362/253 |
| 2002/0050091 A1 * | 5/2002 | Jackson, II | ............ | A01K 85/01 43/42.31 |
| 2004/0216355 A1 * | 11/2004 | Gore | ............... | A01K 85/01 43/17.5 |
| 2006/0265932 A1 * | 11/2006 | Davis | ............... | A01K 85/16 43/17.1 |
| 2008/0092429 A1 * | 4/2008 | Turner | ............... | A01K 85/12 43/17.6 |
| 2013/0307274 A1 * | 11/2013 | Sia | ............... | F03D 9/30 290/55 |
| 2015/0128474 A1 * | 5/2015 | James | ............... | A01K 85/01 43/17.6 |
| 2019/0254268 A1 * | 8/2019 | Parker | ............... | A01K 85/14 |
| 2019/0364864 A1 * | 12/2019 | Jacobson | ............... | A01K 85/01 |
| 2020/0267954 A1 * | 8/2020 | Watters | ............... | A01K 85/12 |
| 2021/0120793 A1 * | 4/2021 | Swanson | ............... | H01F 7/20 |
| 2021/0282381 A1 * | 9/2021 | Hancock | ............... | A01K 85/10 |

FOREIGN PATENT DOCUMENTS

| | | | | |
|---|---|---|---|---|
| CN | 112704049 A | * | 4/2021 | |
| DE | 2317837 A1 | * | 10/1974 | ............ A01K 85/01 |
| DE | 9417739 U1 | * | 12/1994 | ............ A01K 85/14 |
| DE | 20108656 U1 | * | 8/2001 | ............ A01K 85/01 |
| DE | 102018117801 B3 | * | 8/2019 | ............ A01K 85/01 |
| DE | 102020103347 B3 | * | 3/2021 | ............ A01K 85/01 |
| FR | 2305932 A1 | * | 10/1976 | ............ A01K 85/01 |
| JP | 2007049945 A | * | 3/2007 | |
| KR | 200430057 Y1 | * | 11/2006 | |
| KR | 20080015903 A | * | 2/2008 | |
| KR | 101049860 B1 | * | 7/2011 | ............ A01K 85/01 |
| KR | 101121091 B1 | * | 6/2012 | |
| KR | 101396230 B1 | * | 5/2014 | |
| WO | WO-2005065451 A1 | * | 7/2005 | ............ A01K 91/06 |

* cited by examiner

MAGNETIC FIELD POWERED FISHING LURE

RELATED APPLICATIONS

This application claims the benefit of U.S. Provisional Application No. 62/524,177, filed Jun. 23, 2017. This application is herein incorporated by reference in its entirety for all purposes.

FIELD OF THE INVENTION

The invention relates to fishing, and more particularly, to a light up fishing lure requiring no onboard chemical power supply.

BACKGROUND OF THE INVENTION

Most fish are very attracted to bright and shiny objects. Different types of lures having different characteristics are used to catch different varieties of fish. One common lure useful in catching a variety of fish is a spinner type lure.

Existing spinner type fishing lures rely exclusively on light reflecting off of a spoon that revolves around a main body of the lure during a retrieve to capture the attention of fish and attract them to the hook portion of the lure. There is less light available for such lures to reflect on cloudy days, after dusk and prior to dawn, and in murky or deep water and they are therefore less effective in such conditions.

While light-up lures, i.e. lures that are capable of generating their own light, exist, no current design is appropriate for incorporation into the common spinner-type lure. Prior art designs include the use of onboard power sources, such as batteries, or generator type arrangements using a propeller spinning fixed magnets through coils of wire to generate power sufficient to power LEDs or other sources of light. These arrangements are generally used on plug type lures, which can accommodate such an arrangement, but are too bulky for use on spinner type lures and might even discourage fish from biting them if modified to accommodate such features, defeating the purpose of the feature.

What is needed, therefore, are techniques for causing a spinner type lure to self-generate light during a retrieve without the use of batteries or generator arrangements of the prior art or otherwise changing the general shape and characteristics of the lure from the basic, proven spinner type.

SUMMARY OF THE INVENTION

The presently-disclosed invention is a self-powered light-up fishing lure. Unlike other electrified fishing lures available on the market today, this lure utilizes the properties of a magnetic field to introduce electricity to a light source encapsulated within the lure, without the use of a propeller and shaft arrangement.

An embodiment of the proposed lure resembles a typical "rooster tail" type spinning lure available today. Among the unique aspects of this lure are the core body of the lure and the spoon surrounding it, which are modified to comprise the basic elements required for power generation without changing their outward appearance or ability to reflect natural light and otherwise attract fish in the typical way.

While prior art lures light up with power supplies like replaceable batteries, rechargeable internal batteries (plug in), and solar power, for example, lures in accordance with embodiments of the present invention, however, utilize a magnetic spoon to energize a coil or coils in a core of the lure, a magnetic body to energize a coil or coils embedded in the spoon portion of the lure, or a magnetic sheath surrounding a coil or coils in a core of the lure, which are in operative communication with circuitry and at least one light source embedded therein, to provide illumination during a retrieve. By incorporating these functions into existing components, the lure is able to add new functionality without impacting its existing functionality.

Capacitors, batteries, and/or other power storage devices, with or without the aid of microprocessors, are used, in embodiments, to control light activity, e.g. flashing patterns, colors, and frequency.

One embodiment of the present disclosure provides a magnetic field powered fishing lure comprising: a lure body comprising a proximal end configured to be connected to a fishing line and a distal end; a spoon rotatably connected to the lure body; a hook connected to a distal end of the lure body; a coil disposed on said lure; an electric circuit in operative communication with the coil; a light source in operative communication with the electric circuit; and a magnet disposed on the lure, wherein said magnet and the coil are disposed on the lure such that, during a retrieve, the magnet and coil move, relative to one another, in a relatively circular fashion, thereby generating a current that passes through the electrical circuit and lights the light source at least intermittently.

Another embodiment of the present disclosure provides such a magnetic field powered fishing lure wherein the magnet is disposed in the spoon and the coil is disposed around a central portion of the lure body.

A further embodiment of the present disclosure provides such a magnetic field powered fishing lure wherein the magnet comprises a magnetized spoon and the coil is disposed around a central portion of the lure body.

Yet another embodiment of the present disclosure provides such a magnetic field powered fishing lure further comprising a sleeve disposed about and surrounding a central portion of the lure body wherein the sleeve is conically shaped at a portion nearest the distal portion of the lure body and the spoon is configured to rest on the conical portion of the sleeve such that the spoon is kept separated from the lure body.

A yet further embodiment of the present disclosure provides such a magnetic field powered fishing lure wherein the coil is looped longitudinally about the lure body.

Still another embodiment of the present disclosure provides such a magnetic field powered fishing lure wherein the coil is looped latitudinally about the lure body.

A still further embodiment of the present disclosure provides such a magnetic field powered fishing lure wherein the magnet comprises a magnetized sleeve rotatably disposed over the lure body.

Even another embodiment of the present disclosure provides such a magnetic field powered fishing lure wherein the magnetized sleeve is rifled in such a way that it is encouraged to rotate about the lure body during a retrieve.

An even further embodiment of the present disclosure provides such a magnetic field powered fishing lure wherein the electrical circuit comprises a capacitor in communication with the coil and light source, wherein the capacitor is configured to collect a charge generated by the coil and, at a predetermined threshold charge, release it into the light source, imparting a blinking effect on the light source during a retrieve.

A still even another embodiment of the present disclosure provides such a magnetic field powered fishing lure wherein the electrical circuit comprises a microprocessor.

A still even further embodiment of the present disclosure provides such a magnetic field powered fishing lure further comprising a sensor selected from the group consisting of accelerometers, barometers, and temperature sensors in communication with the microprocessor.

Still yet another embodiment of the present disclosure provides such a magnetic field powered fishing lure wherein the sensors are configured to control characteristics of the light source including color, blinking frequency, and intensity in response to measured values selected from the group consisting of retrieve force, retrieve patterns, depth, and water temperature.

A still yet further embodiment of the present disclosure provides such a magnetic field powered fishing lure wherein light source blinking patterns may be controlled through specific, predefined sequences of retrieve motions.

Even yet another embodiment of the present disclosure provides such a magnetic field powered fishing lure further comprising a radio frequency communications module configured to allow a user to connect to the lure and obtain information therefrom and/or configure settings thereof.

An even yet further embodiment of the present disclosure provides such a magnetic field powered fishing lure wherein the radio frequency communication method is selected from the group consisting of WiFi®, Bluetooth®, and ZigBee® standards.

Still even yet another embodiment of the present disclosure provides such a magnetic field powered fishing lure wherein information a user may obtain from the lure comprises bites on the lure, water temperature, current depth, maximum depth, depth at bite, hours fished.

A still even yet further embodiment of the present disclosure provides such a magnetic field powered fishing lure wherein settings a user may configure on the lure comprise blink frequency, brightness, color, and blink patterns.

Yet still even another embodiment of the present disclosure provides such a magnetic field powered fishing lure wherein the light source is a light emitting diode.

One embodiment of the present disclosure provides a magnetic field powered fishing lure comprising: a lure body comprising a proximal end configured to be connected to a fishing line and a distal end; a hook connected to a distal end of the lure body; a waterproof compartment disposed substantially centrally on the lure body, the waterproof compartment having a substantially conical portion adjacent the proximal end of the lure body; a magnetized spoon rotatably connected to the lure body immediately above the waterproof compartment, wherein the magnetized spoon is configured to rest on and rotate about the conical portion of the waterproof compartment during a retrieve; a coil disposed on the lure within the waterproof compartment, wherein the coil is configured to produce electrical power in response to rotation of the magnetized spoon about it; an electric circuit disposed on the lure within the waterproof compartment, wherein the electrical circuit is in operative communication with the coil; and a light source disposed on the lure within the waterproof compartment, wherein the light source is in operative communication with the electric circuit, wherein the light source is configured to light, at least intermittently, during a retrieve.

One embodiment of the present disclosure provides a magnetic field powered fishing lure comprising: a lure body comprising a proximal end configured to be connected to a fishing line and a distal end, wherein a central portion of the lure body is magnetized, contains a magnet, or has a magnet disposed about it; a hook connected to a distal end of the lure body; a spoon rotatably connected to the lure body, wherein the spoon is configured to rotate about a longitudinal axis of the lure body during a retrieve; a coil disposed on or within the spoon, wherein the coil is configured to produce electrical power in response to the rotation of the spoon about the magnetic portion of the lure body; an electric circuit disposed on the spoon, wherein the electrical circuit is in operative communication with the coil; and a light source disposed on the spoon, wherein the light source is in operative communication with the electric circuit, wherein the light source is configured to light, at least intermittently, during a retrieve.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
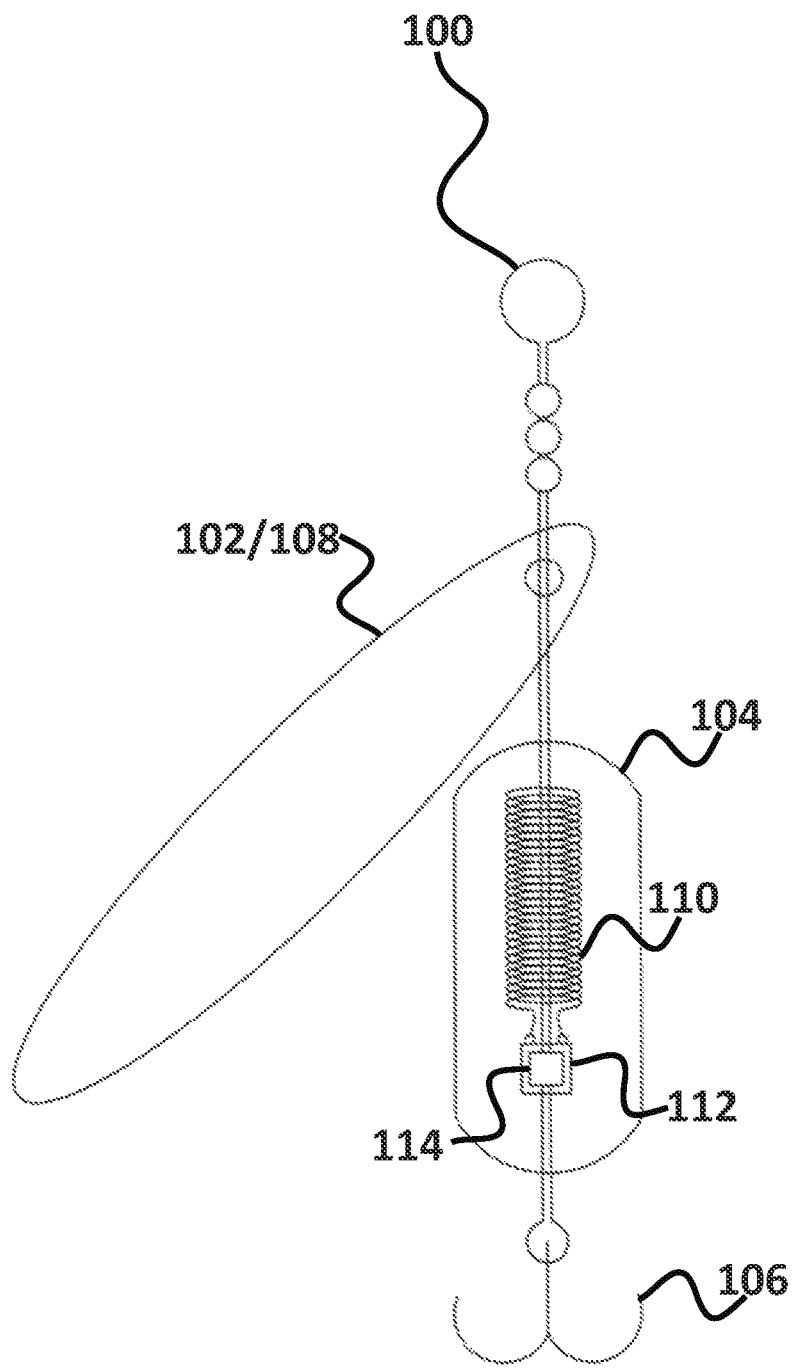
FIG. 1 is a front elevation view of a spinner type lure having a magnetic spoon portion configured to rotate around a central portion containing a horizontally-wound coil and light source, in accordance with embodiments of the present invention.

It has been proven time and time again that light-up lures 100 give the angler an immense advantage in the water. Embodiments of the present invention disclosed herein achieve a lighting effect by utilizing the energy expelled by the angler during lure 100 retrieve, and/or, in the case of a stationary lure 100 in a moving body of water, by the energy transferred to the lure 100 by the water current, which would otherwise be entirely wasted, all without changing the basic outward design of the lure 100, as it is presented to a fish.

Benefits of the present invention include that:
a. Sight is one of the main senses utilized by fish in hunting, by incorporating the time-proven benefit of lighted lures into otherwise proven lures without changing the basic design, fish are even more attracted to the lure 100;

b. The lure 100 requires no batteries or recharging/maintenance;

c. In embodiments utilizing Light Emitting Diodes (LEDs), these light sources require very little energy (some max out at 0.1 watts, for example) and will be easily and brightly illuminated during a typical retrieve;

d. Different colored LED's used in embodiments enable the pursuit of different species of fish that may have an affinity for one color over another; and e. Night fishing with spinner type lures 100 is greatly improved with the introduction of light-up spinner type lures 100 as the fish are once again able to see their prey; and f. The angler can hone their skills and put "action" on their lure 100 by varying retrieve speeds that, in embodiments, directly manipulate the brightness and flickering action on their lure.

Lures 100 in accordance with embodiments of the present invention are powered by temporary electrical charges that are created when the magnet 108 (and thus its magnetic field) moves around and through a coil 110 in the lure 100. Stationary magnets 108 with wires passed through its field produce a temporary burst of electricity and consequently, moving magnets 108 with stationary wires (i.e. the coil 110) produce the same temporary burst of electricity.

Additional elements can be capitalized on to produce brighter or dimmer lighting upon lure retrieve. These elements can include, but are not limited to:

a. Coiling the wire included in the circuit so the magnet 108 interacts with a greater portion of the wire at any time;

b. Utilizing a more powerful magnet 108 on the spoon 102 or magnetizing the spoon 102 more strongly (more electrons influenced, and thus greater power);

c. Utilizing varying wattage bulbs to provide the desired response with different levels of current;

d. Adding resistance to the spoon 102, forcing it to rotate slower, and thus producing dimmer or intermittent light flickers.

As the lure 100 is retrieved, water resistance causes the spoon 102 to turn (as is the standard with currently available spinning lures), which causes the lure 100 to light up due to the changing magnetic field imposed on the circuit 112 that is stationary in relation to the moving magnet 108.

Now referring to FIG. 1, one embodiment of the present invention comprises a spinner type lure 100 having a clear plastic, glass, or other transparent material at its core 104 and a hook 106. This core 104 is hollow and watertight and has within it, a relatively small electrical circuit 112 and light source 114. In embodiments the light source 114 may be an LED. The lure 100 further comprises a magnetic spoon 102/108 (spoon 102 and magnet 108), which are configured to rotate around the core 104 during retrieval of the lure due to water resistance. As the lure 100 encounters water resistance, the magnetized spoon 102/108 revolves around the core 104 at varying speeds (depending on the speed of the retrieve and/or current of the water the lure 100 is immersed in).

In embodiments, the electronic circuitry 112 and light source 114, including the coil 110, of the lure 100 assembly, in embodiments the core 104, is molded in an epoxy or the like (i.e. it is potted) to protect it from damage, which may be due to fish impact or rattling, and to protect the electrical circuit 112 from moisture.

In embodiments, the electronic circuitry 112 and light source 114 of the lure assembly may be inserted into a hollow, water-tight tube 104.

Figure 2:
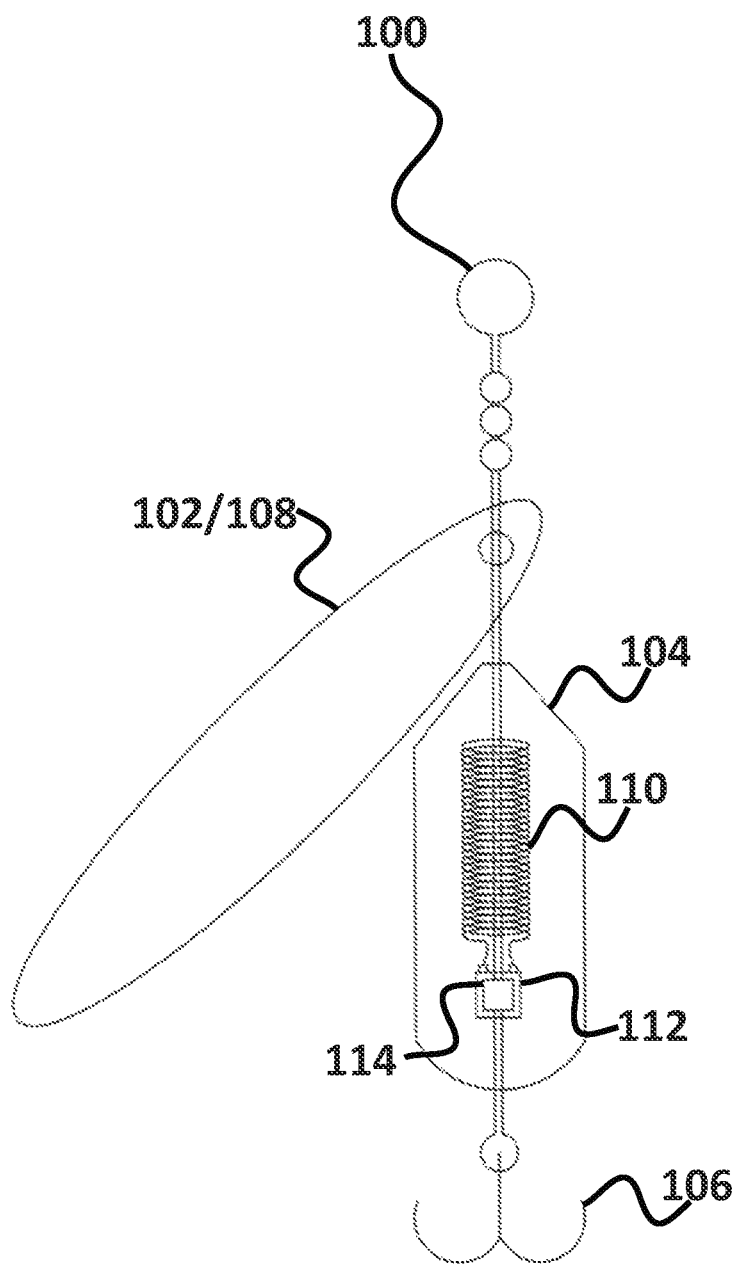
FIG. 2 is a front elevation view of a spinner type lure having a conical central portion containing a horizontally-wound coil and light source about which a magnetized spoon rotates, in accordance with embodiments of the present invention.

In embodiments, such as that shown in FIG. 2, the core 104 portion of the lure 100 comprises a conical top portion on which the magnetized spoon 102/108 rests, preventing the body of the spoon 102 from sticking to the core 104 such that the flow of water during a retrieve would not be able to spin the magnetized spoon 102/108 around the core 104, as required to generate sufficient power to cause the light source 114 to illuminate.

The spoon 102, in embodiments, may be separated from the core 104 of the lure 100 in many other ways, such as by the use of a support fixed to a distal end of the spoon engaged in a track cut concentrically around the core or in other ways that would be known to one of ordinary skill in the art.

In embodiments, as shown in FIGS. 1 and 2, the coil may be looped latitudinally around a central portion of the core.

Figure 3:
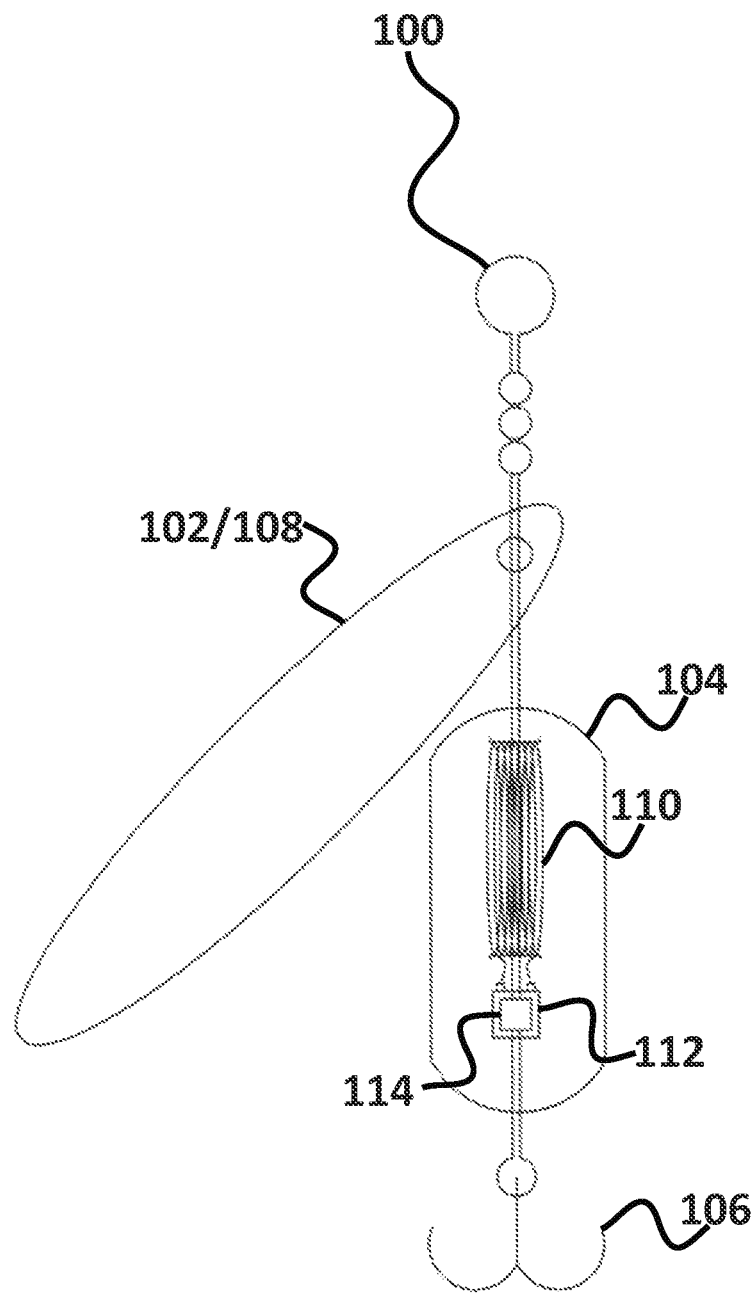
FIG. 3 is a front elevation view of a spinner type lure having a magnetic spoon portion configured to rotate around a central portion containing a vertically-wound coil and light source, in accordance with embodiments of the present invention.

In embodiments, as shown in FIG. 3, the coil may be looped longitudinally around a central portion of the core.

Figure 4:
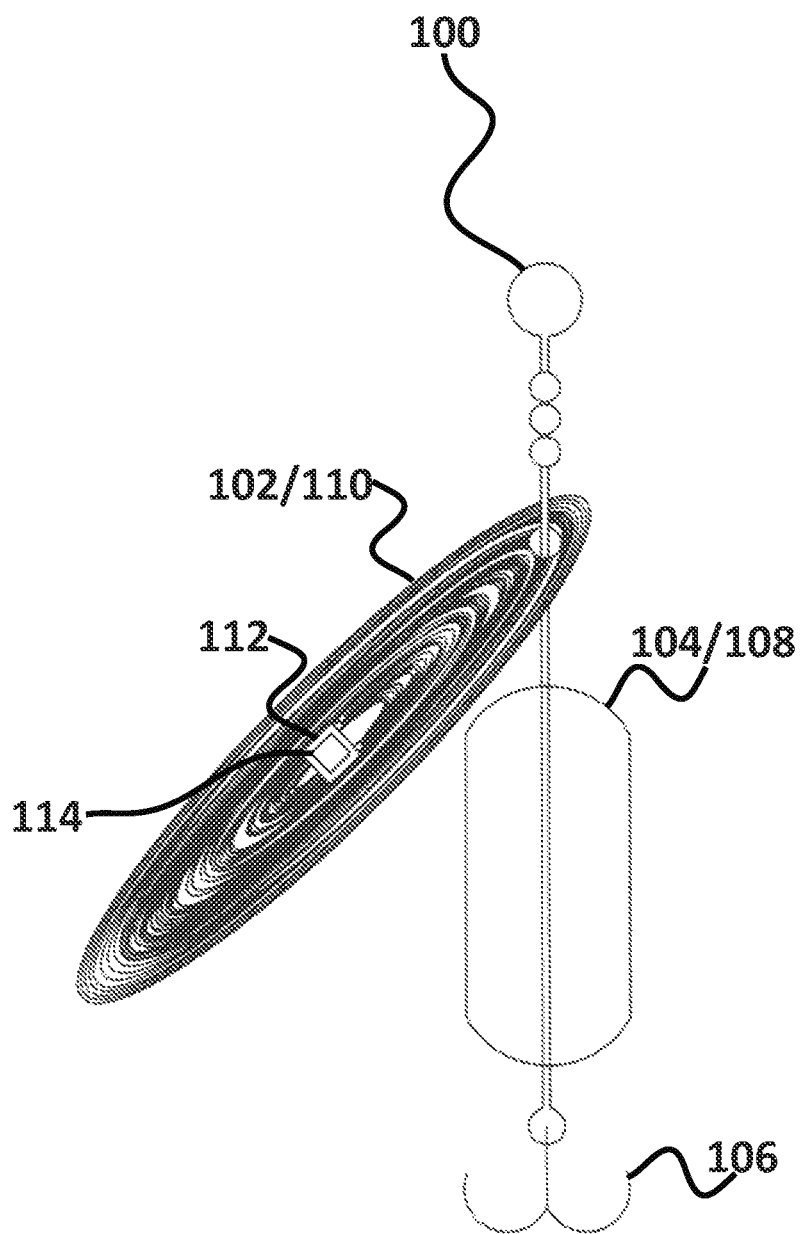
FIG. 4 is a front elevation view of a spinner type lure having a coil and light source located in the spoon portion thereof and a magnet in a central portion thereof, configured in accordance with embodiments of the present invention.

In embodiments, as shown in FIG. 4, the coil and light source may be contained in the spoon portion of the lure while the core of the lure is magnetized.

Figure 5:
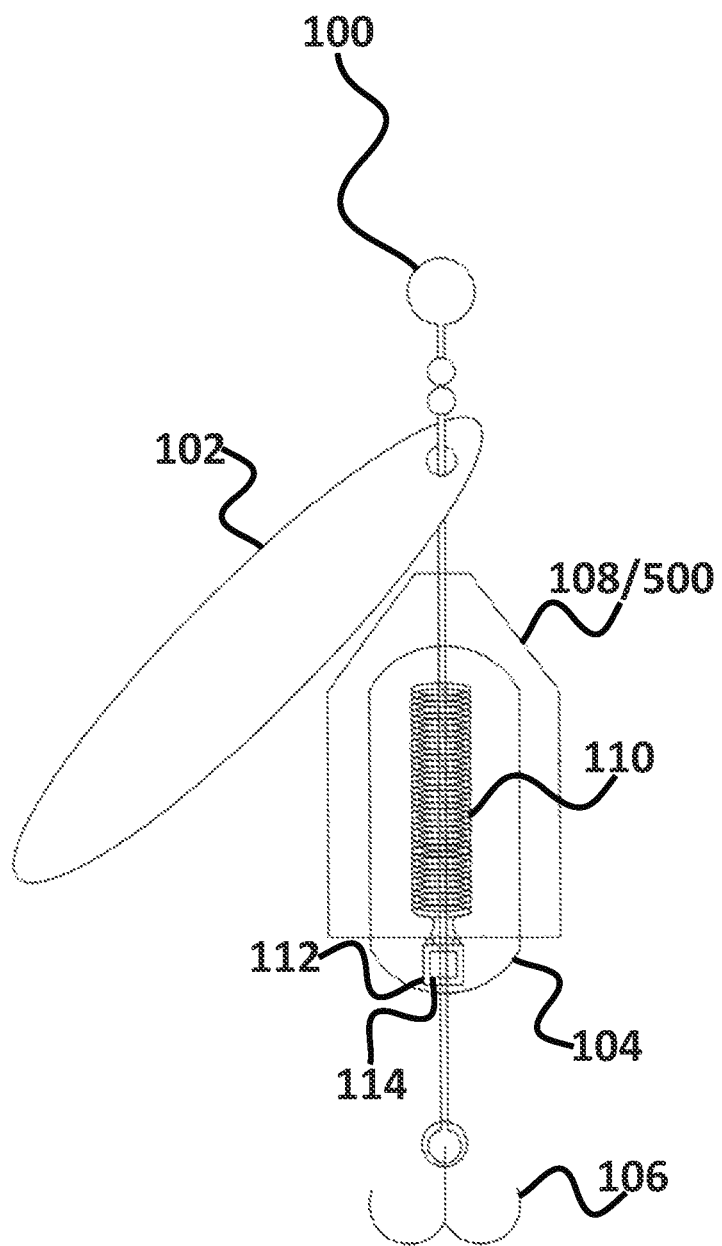
FIG. 5 is a front elevation view of a spinner type lure having a rifled magnetic sleeve that encourages magnet rotation when water resistance is encountered upon lure retrieval, in accordance with embodiments of the present invention.

In embodiments, such as that shown in FIG. 5, a magnetized sleeve 108/500 is loosely mounted over the core 104 of the lure 100 assembly. In embodiments, the core 104 and/or sleeve 500 are rifled to encourage spinning of the magnet 108 about the core 104 of the lure 100 assembly. In such embodiments, the interaction of water passing through the assembly generates the rotational force required to rotate the magnetized portion 108 about the coil 110.

Figure 6:
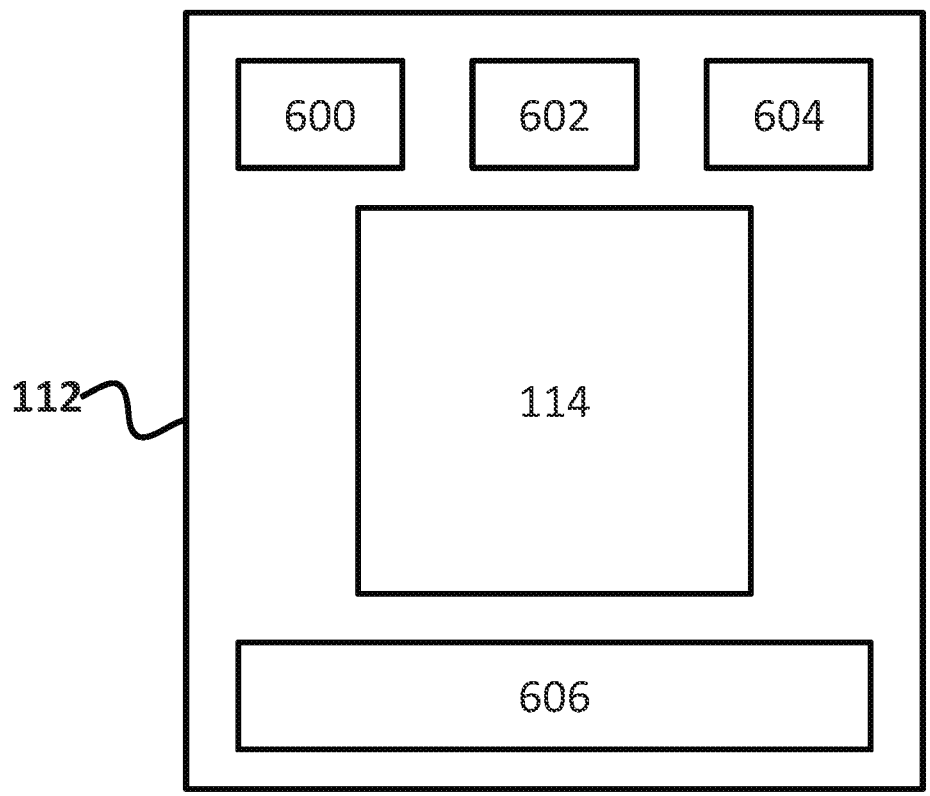
FIG. 6 is a schematic providing a detailed view of the circuit shown in embodiments of the previous, including components thereof.

In embodiments, such as that shown in FIG. 6, the electrical circuitry 112 comprises a capacitor 602 in communication with said coil 110 and light source 112, wherein said capacitor 602 is configured to collect a charge generated by said coil 110 and, at a predetermined threshold charge, release it into said light source 114, causing a blinking effect during a retrieve.

Embodiments also incorporate a sensor or sensors 600, such as accelerometers, barometers, and/or temperature sensors, which are used to control light 114 activity in response to lure 100 motion, depth, and water temperature, respectively, as depicted in FIG. 6. In embodiments, control of the light 114 in response to sensor 600 output is handled by a microprocessor 604.

In embodiments, retrieve patterns, e.g. four successive hard pulls on the lure 100, are used to switch between pre-programmed lighting patterns.

In still other embodiments, the lure 100 is configured to allow a user to communicate with it through radio frequency communications, such as Bluetooth® and/or WiFi®, via a radio frequenct communications module 606. Such communications are used, in embodiments, to allow a user to monitor bites on the lure 100, water temperature, current depth, maximum depth, depth at bite, hours fished, and other information collected by the lure 100. Such communications are also used, in embodiments, to allow the user to change settings on the lure 100, such as blink frequency, brightness, color, patterns, and other functions of the light source 112.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

What is claimed is:

1. A magnetic field powered fishing lure comprising:
a lure body comprising a proximal end configured to be connected to a fishing line and a distal end;
a spoon rotatably connected to said lure body;
a hook connected to the distal end of said lure body;
a coil disposed on said lure;
an electric circuit in operative communication with said coil;
a light source in operative communication with said electric circuit; and
a magnet disposed on said lure,
wherein said magnet and said coil are disposed on said lure such that, during a retrieve, the magnet and coil move, relative to one another, in a relatively circular fashion, thereby generating a current that passes through said electrical circuit and lights said light source at least intermittently, and
wherein said magnet is disposed in said spoon and said coil is disposed around a central portion of said lure body.

2. The magnetic field powered fishing lure of claim 1 wherein said coil is looped latitudinally about said lure body.

3. The magnetic field powered fishing lure of claim 1 wherein said electrical circuit comprises a capacitor in communication with said coil and light source, wherein said capacitor is configured to collect a charge generated by said coil and, at a predetermined threshold charge, release it into said light source, imparting a blinking effect on the light source during a retrieve.

4. The magnetic field powered fishing lure of claim 1 wherein said electrical circuit comprises a microprocessor.

5. The magnetic field powered fishing lure of claim 4 further comprising a sensor selected from the group consisting of accelerometers, barometers, and temperature sensors in communication with said microprocessor.

6. The magnetic field powered fishing lure of claim 5 wherein said sensors are configured to control characteristics of said light source including color, blinking frequency, and intensity in response to measured values selected from the group consisting of retrieve force, retrieve patterns, depth, and water temperature.

7. The magnetic field powered fishing lure of claim 6 wherein light source blinking patterns may be controlled through specific, predefined sequences of retrieve motions.

8. The magnetic field powered fishing lure of claim 7 further comprising a radio frequency communications module configured to allow a user to connect to said lure and obtain information therefrom and/or configure settings thereof.

9. The magnetic field powered fishing lure of claim 8 wherein information from said lure comprises bites on the lure, water temperature, current depth, maximum depth, depth at bite, hours fished.

10. The magnetic field powered fishing lure of claim 8 wherein settings on the of said lure comprise blink frequency, brightness, color, and blink patterns.

11. The magnetic field powered fishing lure of claim 1 wherein said light source is a light emitting diode.

12. A magnetic field powered fishing lure comprising:
a lure body comprising a proximal end configured to be connected to a fishing line and the distal end;
a hook connected to a distal end of said lure body;
a waterproof compartment disposed substantially centrally on said lure body, said waterproof compartment having a substantially conical portion adjacent the proximal end of said lure body;
a magnetized spoon rotatably connected to said lure body immediately above said waterproof compartment, wherein said magnetized spoon is configured to rest on and rotate about said conical portion of said waterproof compartment during a retrieve;
a coil disposed on said lure within said waterproof compartment, wherein said coil is configured to produce electrical power in response to rotation of said magnetized spoon about it;
an electric circuit disposed on said lure within said waterproof compartment, wherein said electrical circuit is in operative communication with said coil; and
a light source disposed on said lure within said waterproof compartment, wherein said light source is in operative communication with said electric circuit,
wherein said light source is configured to light, at least intermittently, during a retrieve.

13. A magnetic field powered fishing lure comprising:
a lure body comprising a proximal end configured to be connected to a fishing line and a distal end;
a spoon rotatably connected to said lure body;
a hook connected to a distal end of said lure body;
a coil disposed on said lure;
an electric circuit in operative communication with said coil;
a light source in operative communication with said electric circuit; and
a magnet disposed on said lure,
wherein said magnet and said coil are disposed on said lure such that, during a retrieve, the magnet and coil move, relative to one another, in a relatively circular fashion, thereby generating a current that passes through said electrical circuit and lights said light source at least intermittently, and
wherein said magnet comprises a magnetized spoon and said coil is disposed around a central portion of said lure body.

* * * * *